(12) United States Patent
Bottari et al.

(10) Patent No.: US 11,314,772 B2
(45) Date of Patent: Apr. 26, 2022

(54) ROBUST DATA REPLICATION AMONG DATA CENTERS

(71) Applicant: Telefonaktiebolaget LM Ericsson (publ), Stockholm (SE)

(72) Inventors: Giulio Bottari, Pisa (IT); Stefano Ruffini, Pisa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 367 days.

(21) Appl. No.: 16/605,924

(22) PCT Filed: Apr. 26, 2017

(86) PCT No.: PCT/EP2017/059981
§ 371 (c)(1),
(2) Date: Oct. 17, 2019

(87) PCT Pub. No.: WO2018/196969
PCT Pub. Date: Nov. 1, 2018

(65) Prior Publication Data
US 2021/0124758 A1    Apr. 29, 2021

(51) Int. Cl.
*G06F 16/27*    (2019.01)
*G06F 11/30*    (2006.01)
(Continued)

(52) U.S. Cl.
CPC .......... *G06F 16/27* (2019.01); *G06F 11/3006* (2013.01); *G06F 11/3419* (2013.01);
(Continued)

(58) Field of Classification Search
CPC ............... G06F 11/2007; G06F 11/094; G06F 11/2097; G06F 11/3006; G06F 11/3419;
(Continued)

(56) References Cited

U.S. PATENT DOCUMENTS

| | | | | |
|---|---|---|---|---|
| 8,447,730 B1 * | 5/2013 | Mortazavi | ........... | G06F 11/3419 |
| | | | | 707/634 |
| 11,132,135 B2 * | 9/2021 | Catalano | ............. | G06F 11/3034 |

(Continued)

FOREIGN PATENT DOCUMENTS

| | | | | |
|---|---|---|---|---|
| EP | 2736194 A1 * | 5/2014 | ........ | H04L 43/0864 |
| EP | 2950488 A1 * | 12/2015 | ............. | H04L 45/70 |
| KR | 20170132660 A * | 12/2017 | ......... | H04L 67/1097 |

OTHER PUBLICATIONS

Skorin-Kapov, Nina, "Physical-layer security in evolving optical networks", Article in IEEE Communications Magazine; Optical Communications, Aug. 2016, pp. 1-9.

*Primary Examiner* — Alina A Boutah
(74) *Attorney, Agent, or Firm* — Sage Patent Group

(57) ABSTRACT

A method of data replication between a first data center and a second data center, wherein the first data center has a data set to be replicated, the method comprising: determining (501) whether a first path from the first data center to the second data center is suitable for the data set to be replicated, by: transmitting (502) test data along the first path, taking (503) latency measurements for the test data along the first path; and determining a latency parameter of the first path using the latency measurements; and determining (504) if the latency parameter of the test data is less than a maximum latency threshold. If the latency parameter is less than the maximum latency threshold, the method performs (505) replication of the data set using the first path.

19 Claims, 14 Drawing Sheets

(51) Int. Cl.
    *G06F 11/34*       (2006.01)
    *H04L 12/26*       (2006.01)
    *H04L 43/0852*    (2022.01)
    *H04L 43/10*       (2022.01)
    *H04L 43/16*       (2022.01)

(52) U.S. Cl.
    CPC .......... *H04L 43/0852* (2013.01); *H04L 43/10* (2013.01); *H04L 43/16* (2013.01)

(58) Field of Classification Search
    CPC .. G06F 11/3495; G06F 16/27; H04L 43/0852; H04L 43/10; H04L 43/16
    See application file for complete search history.

(56) References Cited

U.S. PATENT DOCUMENTS

| | | | |
|---|---|---|---|
| 2009/0122697 A1* | 5/2009 | Madhyasha | H04L 41/12 370/229 |
| 2011/0090802 A1* | 4/2011 | Kotrla | H04L 41/5038 370/248 |
| 2012/0072544 A1* | 3/2012 | Pankratov | H04L 43/08 709/219 |
| 2014/0010094 A1* | 1/2014 | Robitaille | H04L 43/0858 370/252 |
| 2014/0173090 A1 | 6/2014 | Davis | |
| 2014/0279897 A1* | 9/2014 | Bourbonnais | G06F 16/27 707/634 |
| 2015/0222535 A1* | 8/2015 | Bergman | H04L 43/16 709/213 |
| 2016/0218947 A1* | 7/2016 | Hughes | H04L 12/2854 |
| 2018/0295144 A1* | 10/2018 | Jackson | H04L 43/0864 |
| 2019/0386913 A1* | 12/2019 | Wei | H04L 45/7453 |

\* cited by examiner

ROBUST DATA REPLICATION AMONG DATA CENTERS

TECHNICAL FIELD

The technical field is data replication between data centers.

BACKGROUND

As demands for cloud services proliferate, content service providers increasingly store and replicate massive amounts of content in multiple data centers.

Protecting data within and across multiple data centers is essential to keeping a business online and operational. For this scope data replication is used. Replication enables the data owner to have identical copies of information on multiple servers and across more than one data center. FIG. 1 is a schematic diagram of a group of data centers linked by a network 100. Three data centers, 101, 102, 103 are illustrated as an example, but frequently, many more are used. The data centers are linked by a plurality of paths 104 and routers 105.

Conventionally, two methods have been used for data replication, synchronous and asynchronous. FIG. 2 is a data flow diagram illustrating synchronous replication. Two data centers are illustrated, the first data center 201 having a data set to be replicated, and the second data center 202 being the intended recipient of the data set. The data set originates from an application located at a server 203 at the first data center. The first data center comprises a first local storage 204 and the second data center comprises a second local storage 205. The process of synchronous replication begins with the transmission 206 of the data set from the server 203 to the first local storage 204. The data set is then transmitted 207 to the second data center 202 and stored on the second local storage 205. Upon completion of the transmission and receipt of the data set by the second data center, the second data center provides an acknowledgment 208, which it transmits back to the first data center. Upon receipt of the acknowledgement, the first data center passes 209 the acknowledgement to the application. The replication of the data is now completed.

Synchronous replication guarantees continuous data integrity during the replication process with no extra risk of data loss because the second data center has an identical copy of the data at all times. However, there is a disadvantage of synchronous replications, in that, before responding to the application, the server must wait until the data replication process is completed. An acknowledgement is sent to the application only after an acknowledgement has been received from the second data center. This results in an increased response time and a slowing of applications. Performance with synchronous replication is highly impacted by factors such as link latency and link bandwidth of the connection between the data centers. In particular, synchronous replication used between data centers is very sensitive to transmission latency, limiting the maximum distance suitable for synchronous replications to paths of 100-200 km.

An alternative to synchronous replication is asynchronous replication. FIG. 3 is a data flow diagram illustrating the process of asynchronous replication. As in FIG. 2, two data centers are shown, wherein the first data center 301 has a data set to be replicated, and the second data center 302 is the intended recipient of the data set. As in FIG. 2, the data set originates from an application located at a server 303 at the first data center 301. The first data center comprises a first local storage 304 and the second data center 302 comprises a second local storage 305. The process of asynchronous replication begins with the transmission 306 of the data set from the server 303 to the first local storage 304. In the case of asynchronous replication, however, the local storage responds 307 with an acknowledgement to the application immediately upon receipt of the data set. The data is some time later transmitted 308 to the second data center, which provides an acknowledgement. However, the application receives an acknowledgement prior to the completion of the replication process and hence is able to continue its processes with a shorter wait. However, there is a disadvantage in that, although asynchronous replication overcomes the performance limitations of synchronous replication, but some data loss must be accepted.

A semi-synchronous replication has also been defined where a replication is considered complete as soon as the second data center acknowledges that it has received the data either into memory or to a dedicated log file. The actual remote write onto the local storage is not performed immediately but is performed asynchronously. This results in better performance than synchronous replication in terms of time for completion of replication, but does not offer a guarantee of durability. Synchronous replication is therefore the only choice for business critical data transfers.

The issue of transmission latency not only reduces performance of synchronous replication systems, however, it also makes them vulnerable to attacks on the system. Increasingly, such attacks involve damage to physical components in a network. Systems which use synchronous replication are vulnerable to a particular type which involves the cutting of fibers or damaging of components in the path of the replication data between two servers. Optical fiber systems typically have protection or restoration mechanisms which provide alternative pathways in the event of a network failure. However, if the backup pathway provides a route for which the latency is greater than a synchronous replication system can tolerate, then the result will be a replication failure even with a restoration or protection switch. FIG. 4 is a schematic diagram of a network in which such an attack takes place. In FIG. 4, there are two data centers 401, 402. They are connected by a network 403 comprising a plurality of routers 404 and links 405. Prior to an attack, the two data centers communicate via a first path which 406, which comprises routers A, D and H. There are two alternative paths through the next, second path 407 and third path 408. Of these, the second path 407 has a low enough latency for synchronous replication, but the third path 408 does not. If an attacker makes breaks 409, 410 in the fiber in the first and second paths, then data will be diverted through the third path 408. The system will have been restored, but to a path which can no longer support synchronous replication.

SUMMARY

Accordingly, it is an aim of the present disclosure to provide a mechanism for determining whether synchronous replication can be implemented. In some embodiments, an aim is to provide an alternative mechanism in the event that the latency of the network is too great.

According to a first aspect, there is provided a method of data replication between a first data center and a second data center, wherein the first data center has a data set to be replicated. The method comprises determining whether a first path from the first data center to the second data center is suitable for the data set to be replicated, by: transmitting test data along the first path, taking latency measurements for the test data along the first path and determining a latency parameter of the first path using the latency measurements. The method further comprises determining if the latency parameter of the test data is less than a maximum latency threshold, and, if the latency parameter is less than the maximum latency threshold, performing replication of the data set using the first path.

In an embodiment, the method further comprises, if the latency parameter of the first path is greater than the maximum latency threshold, identifying a second path between the first data center and the second data center; determining whether the second path from the first data center to the second data center is suitable for the data set to be replicated, by transmitting test data along the second path, taking latency measurements for the test data along the second path and determining a latency parameter of the second path using the latency measurements. The method further comprises determining if the latency parameter of the test data is less than the maximum latency threshold, and, if the latency parameter is less than the maximum latency threshold, performing replication of the data set using the second path.

In an embodiment, the method further comprises, identifying a group of paths between the first data center and the second data center. If a respective latency parameter for each path in the group is greater than the maximum latency threshold, it is identified that the second data center cannot be used for synchronous replication. If the second data center cannot be used, the method further comprises identifying a third data center which has a path to the first data center, the path having a latency parameter less than the maximum latency threshold, and performing replication of the data set at the third data center.

In an embodiment, the method further comprises, at an application running in the first data center, receiving a replication wait time, transmitting the data to a said replication data center, and, upon transmission, suspending at least one part of a process of the application. After elapse of a period equal to the replication wait time the at least one part of the process of the application is resumed.

In an embodiment, the method further comprises receiving the data set from an application, transmitting the data to a said replication data center, and, after a replication wait period, sending an indication to the application that the data has been replicated. The replication wait period is calculated using the latency parameter of a said path selected for replication.

In an embodiment, an acknowledgement is provided by the replicating data center.

In an embodiment, the method further comprises storing the data set at a local storage located in the first data center.

In an embodiment, the replication wait period is calculated using the latency parameter of the selected path and an estimated write period at the destination data center.

In an embodiment, determining the latency parameter of a path comprises the steps of: setting a required probability, the required probability being a probability that the data set will suffer a latency less than the latency parameter determining a mean of the latency measurements, determining a standard deviation of the latency measurements, and using the mean, standard deviation and required probability to set the latency parameter.

In an embodiment, latency determination is performed periodically during a data replication.

According to a second aspect, there is provided a controller for a data center network comprising a processor, a memory for storing data and instructions, a transmitter for transmitting data to a communications network and a receiver for receiving data from the communications network. The controller is configured to transmit test data along the first path, take latency measurements for the test data along the first path and determine a latency parameter of the first path using the latency measurements. The processor is further configured to determine if the latency parameter of the test data is less than a maximum latency threshold, and if the latency parameter is less than the maximum latency threshold, perform replication of the data set using the first path.

In an embodiment, the processor is further configured to, if the latency parameter of the first path is greater than the maximum latency threshold, identify a second path between the first data center and the second data center. The processor is further configured to transmit test data along the second path take latency measurements for the test data along the second path, and determine a latency parameter of the second path using the latency measurements. The processor is further configured to determine if the latency parameter of the test data is less than a maximum latency threshold, and if the latency parameter is less than the maximum latency threshold, perform replication of the data set using the second path. In an embodiment, the processor is further configured to identify a group of paths between the first data center and the second data center, and if a respective latency parameter for each path in the group is greater than the maximum latency threshold, identify that the second data center cannot be used for synchronous replication. The processor is further configured, if the second data center cannot be used, to identify a third data center which has a path to the first data center, the path having a latency parameter less than the maximum latency threshold, and perform replication of the data set at the third data center.

In an embodiment, the processor is further configured to perform the replication by receiving the data set from an application, transmitting the data to a said replicating data center, and after a replication wait period, sending an indication to the application that the data has been replicated, wherein the replication wait period is calculated using the latency parameter of a said selected path.

In an embodiment, the controller is further configured to store the data set at a local storage within the first data center.

In an embodiment, the processor is further configured to determine a mean of the latency measurements, determine a standard deviation of the latency measurements, and use a required probability, the required probability being a probability that the data set will suffer a latency less than the latency parameter, the mean and the standard deviation to determine the latency parameter.

In an embodiment, the controller further comprises a clock with an accuracy at least 0.1 of a minimum latency.

According to a third aspect, there is provided a data center comprising a controller according to the second aspect.

According to a fourth aspect, there is provided a computer program, comprising instructions which, when executed on at least one processor, cause the at least one processor to carry out a method according to the first aspect.

According to a fifth aspect, there is provided a computer program product comprising a computer program according to the fourth aspect According to a sixth aspect, there is provided a carrier containing the computer program according to the fifth aspect, wherein the carrier optionally includes an electrical signal, an optical signal, a radio signal, a magnetic tape or disk, an optical disk or a memory stick.

BRIEF DESCRIPTION OF THE DRAWINGS

The above and other aspects of the present disclosure will now be described by way of example only, with reference to the following figures.

DETAILED DESCRIPTION

Figure 1:
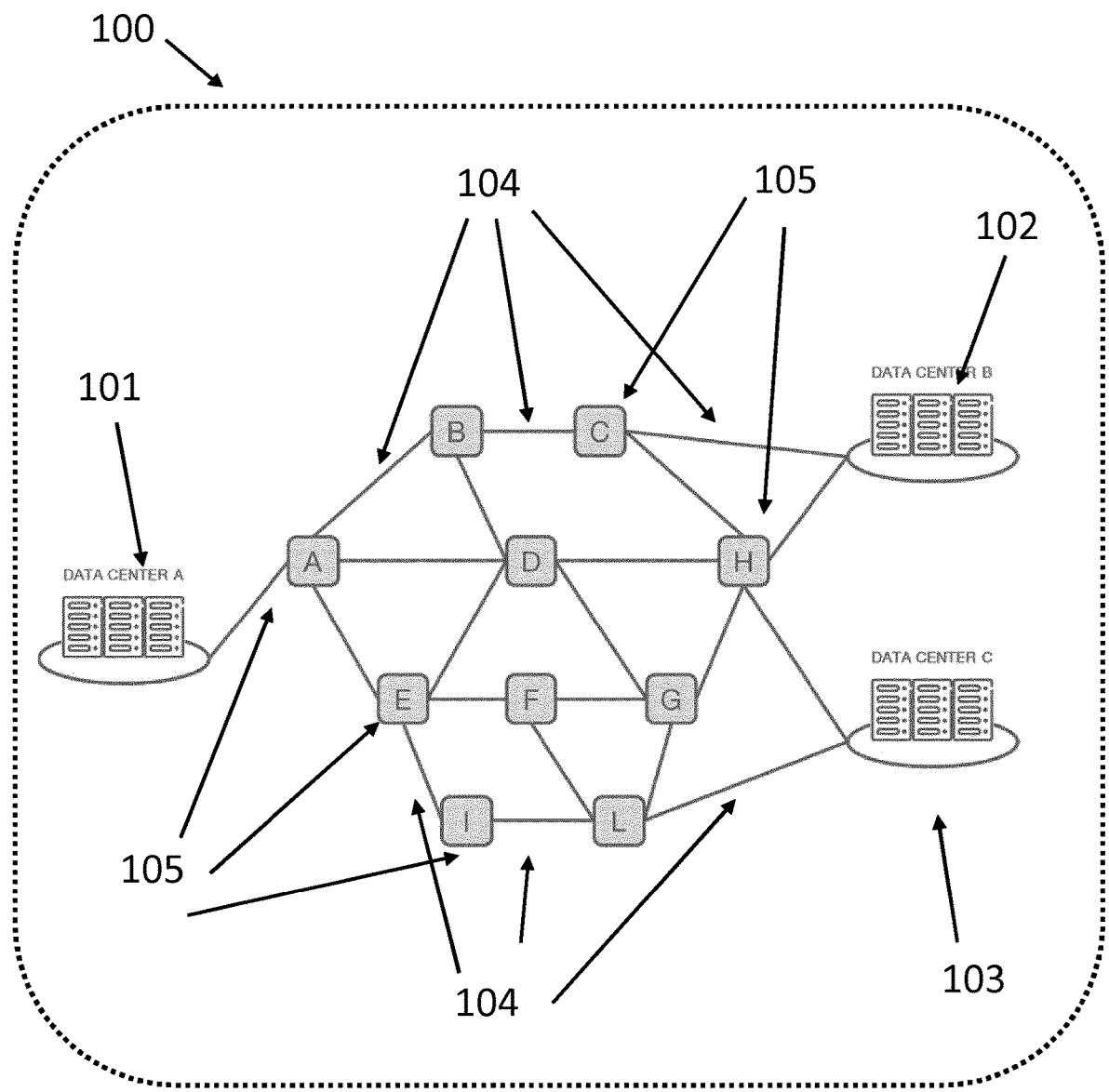
FIG. 1 is a schematic diagram of a group of data centers linked by a network.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The present disclosure provides a method for improving robustness of synchronous data replication among data centers connected by a communications network and, in some examples, for speeding-up the replication process. The method is based on determinations of the real-time latencies between data centers. These determinations are performed by replicating test data over the same protocols and channels of real data. In an embodiment, determination of latency also enables a "pseudo-synchronous" mode which speeds-up the replication process at a price of a slightly reduced robustness.

The method enables any one of the changing of the path over which the replication is implemented, the changing of the replicating data center and the implementation of pseudo-synchronous replication, in the event that the latency on the path used for replication exceeds a threshold level. A change in latency on the path may be the result of an increase in network traffic, a link or node failure, an attack as described in the background section or another cause. For the method of the disclosure, it does not matter what the cause of the increase in latency is.

In order to provide a realistic determination of the real-time latency for a path between two data centers, in an embodiment, a dummy replication procedure is implemented which comprises the transmission of test data between the data centers. Measurements are made to determine the delay suffered by the test data. In an embodiment, latency measurements require that a stable clock is available at all the DCs with an accuracy, over the measurement period, of at least $1/10$ of the minimum expected latency, e.g. the smallest calculated latency between any data centers handling data replication according to this method In an embodiment, the mean latency m and the relevant standard deviation σ are calculated with periodical measurements, making use of test data, for all primary and backup paths planned between the two data centers. In another embodiment, paths that could be eligible for "on the fly", not path-planned, recovery could also be tested for latency with the same method.

In an embodiment, a maximum acceptable latency is determined, based on a certain probability that data will be successfully transmitted within that time. In an embodiment for example, a "five 9's" limit is used, meaning that 99.999% of all data will be successfully received within the time threshold. The person skilled in the art will appreciate that other percentages may be used and the disclosure is not limited to any given probability threshold.

In an embodiment, an assumption is made that the latencies are normally distributed. With such an assumption, a determination can be made of the latency requirement as follows:

$$e = m + 4*\sigma$$

wherein e is the latency level, m is the mean of the latency values and σ is the standard deviation. In other embodiments, other statistical distributions may be used, such as the Pareto distribution. The person skilled in the art will appreciate that there are many different distributions that could be used.

Figure 5:
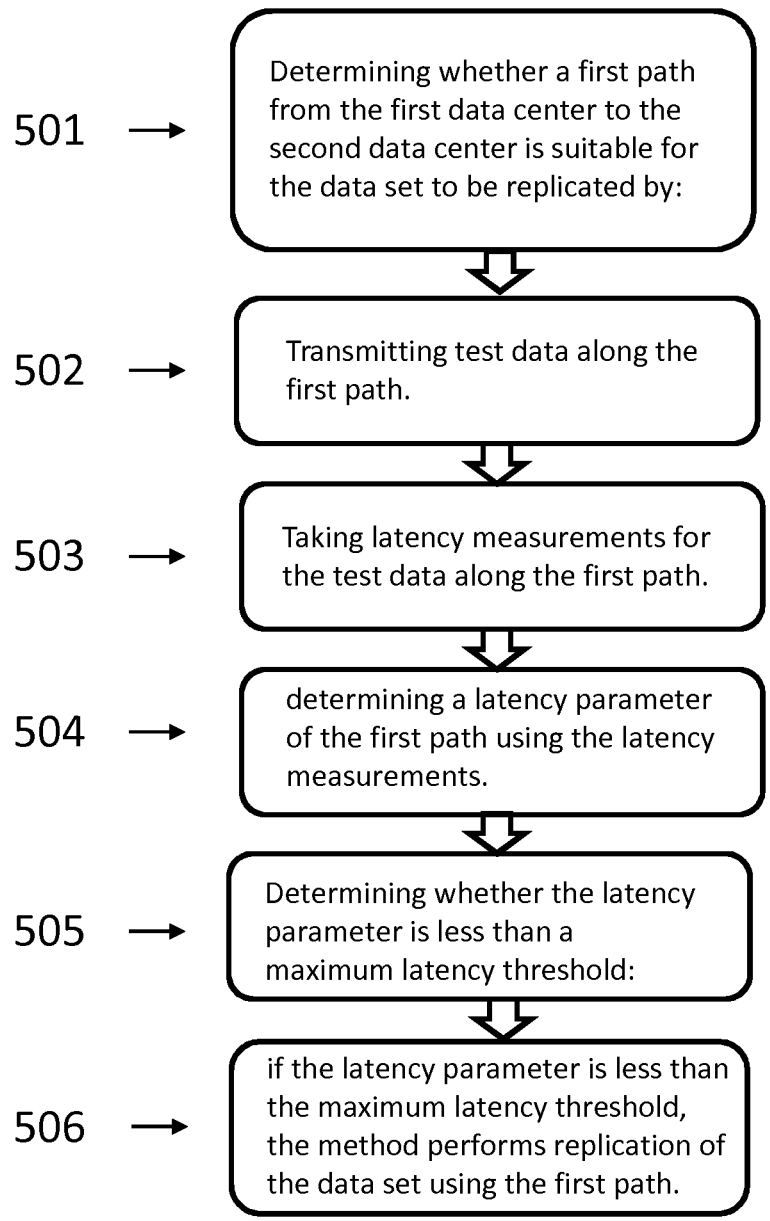
FIG. 5 is a flow chart illustrating a method of testing the latency on a link according to an embodiment.

FIG. 5 is a flow chart illustrating the steps of a method of estimating latency according to an embodiment. The method begins by determining 501 whether a first path from the first data center to the second data center is suitable for the data set to be replicated. This is achieved by transmitting test data along the path 502, and taking latency measurements for the test data. A latency parameter is then determined 503 using the latency measurements. It is then determined whether the latency parameter is less than a maximum latency threshold. If the latency threshold is less than the threshold, then replication of the data is performed using the first path. In an embodiment, the latency parameter represents a round trip delay from the first data center to the second data center and then back to the first data center. In another embodiment, a one way delay may be determined and used for the latency parameter.

In an embodiment, if the first path is unsuitable, then a second path between the first data center and the second data center will be selected and tested to see if it is suitable for data replication. As for the testing of the first path, test data is transmitted along the path. Latency measurements are made and a latency parameter is determined. The second path may be used if the latency parameter is less than the maximum latency threshold.

Figure 6:
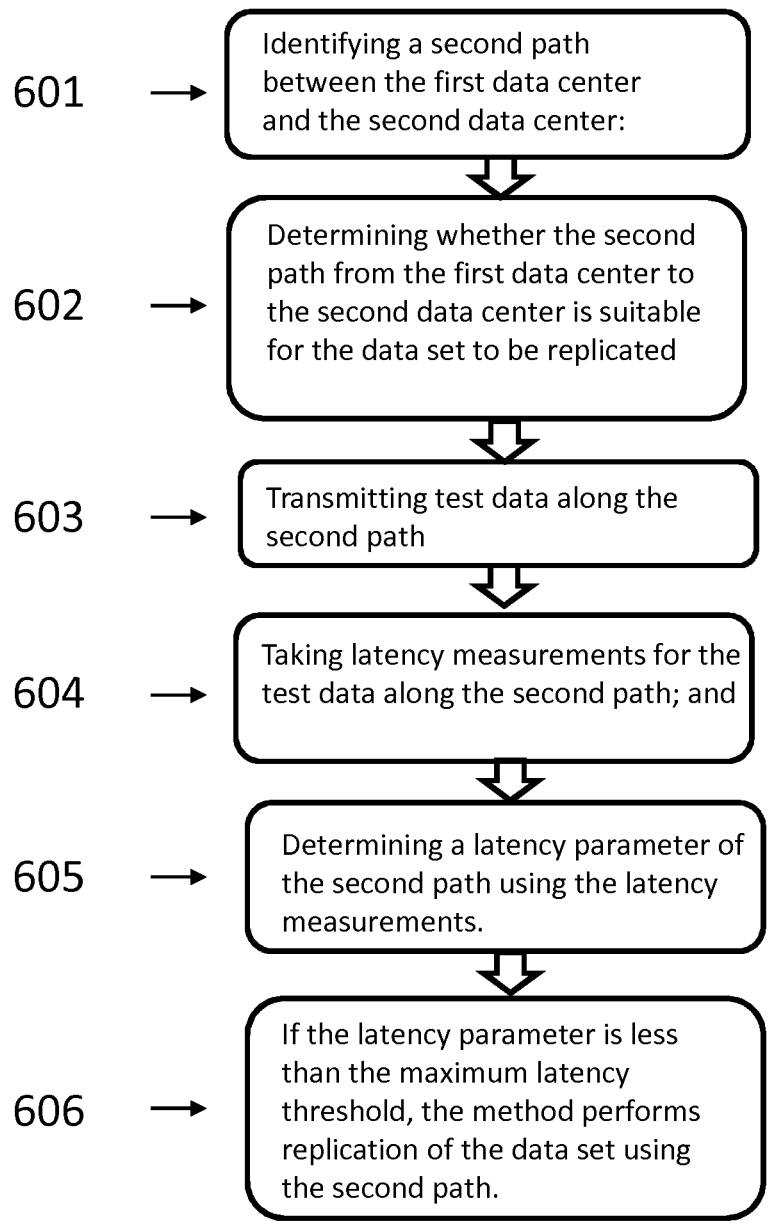
FIG. 6 is a flow chart illustrating a method of testing the latency on a link according to another embodiment.

FIG. 6 is a flow chart illustrating the steps of testing a second path according to an embodiment. The method comprises, after it has been determined that the first path is not suitable, identifying 601 a second path between the first data center and the second data center. The steps of the method comprise: determining 602 whether the second path from the first data center to the second data center is suitable for the data set to be replicated, by transmitting 603 test data along the second path, taking 604 latency measurements for the test data along the second path, and determining a latency parameter of the second path using the latency measurements. It is then determined 605 if the latency parameter of the test data is less than the maximum latency threshold. If the latency parameter is less than the maximum latency threshold, the method performs 606 replication of the data set using the second path.

In an embodiment, if the second path is unsuitable, one or more further paths are tested. This will continue until either a suitable path is found, a certain number or group of paths have been tested or all the paths available which match a criterion have been tested. If no suitable path is found, then, in an embodiment, a third data center, which has both the necessary capacity for replication and a suitable path to the first server, is identified and used for replication.

Thus, a path is selected for data replication between a first and second data centers. The first path tested may have the lowest latency or be the shortest path between the data centers transferring data, or identified as a first path to test according to any criteria. This first path may be selected as the path for data replication if the test data transmitted on the first path is within the latency parameter threshold. If the determined latency parameter is not within the threshold, the second path, and optionally one or more further paths may be tested. Alternatively, a plurality of paths may be tested using test data to determine the latency parameter of the test data. The path selected is the path which satisfies the latency parameter threshold and according to a criteria, e.g. shortest path or lowest latency parameter of the test data.

Figure 7:
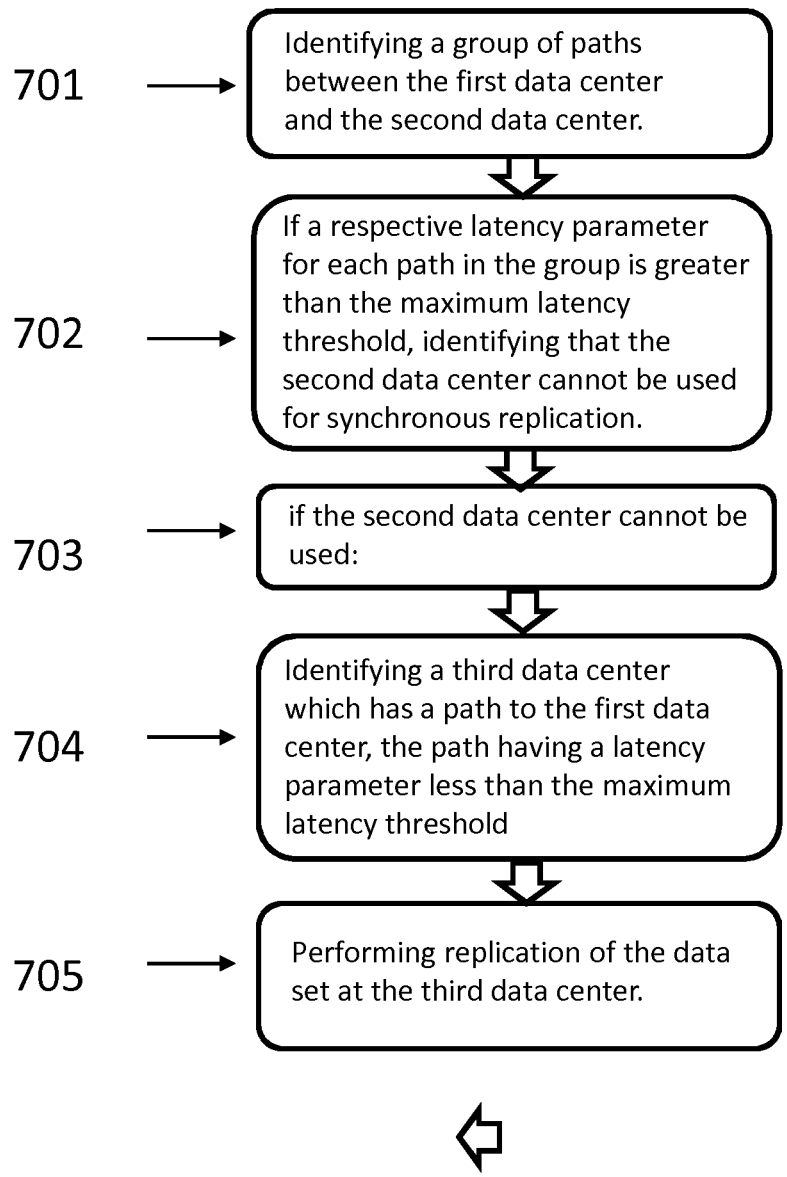
FIG. 7 is a flow chart illustrating a method of testing the latency on a link according to yet another embodiment.

FIG. 7 is a flow chart illustrating the steps of selecting a third data center according to an embodiment. The method comprises Identifying 701 a group of paths between the first data center and the second data center. If a respective latency parameter for each path in the group 702 is greater than the maximum latency threshold, it is identified that the second data center cannot be used for synchronous replication. If the second data center 703 cannot be used, the method further comprises identifying a third data center 704 which has a path to the first data center, the path having a latency parameter less than the maximum latency threshold. When such a third data center has been identified, replication 705 of the data set is performed at the third data center.

In an embodiment, the latency measurements are repeated periodically. However, the person skilled in the art will recognise that there are other options for when test data is sent, for example in response to a network event. The disclosure is not limited to any particular timing of the latency testing. In embodiments, the methods of any of FIGS. 5, 6 and 7 are implemented by a controller for the first data center. The controller may be located at the first data center, or may be remotely located.

In an embodiment, the latency parameter is determined from the latency measurements, e.g. by determining a latency level within which there is a certain percentage of the data being transmitted across the path. For example, it may be necessary for there to be a 99.99% chance that the data will arrive within a given latency period. In an embodiment, an assumption is made that the latency distributions will be normally distributed. In an embodiment, this assumption is used to determine a latency parameter by calculating a mean and a standard deviation of the latency values measured using the test data. The required probability is then used to determine the number of standard deviations from the mean that is needed to ensure the proportion of data arriving within the latency limit. For a 0.9999 probability, 4 standard deviations are needed. The latency parameter for the link will be set at a level equal to the mean plus 4 standard deviations.

Figure 8:
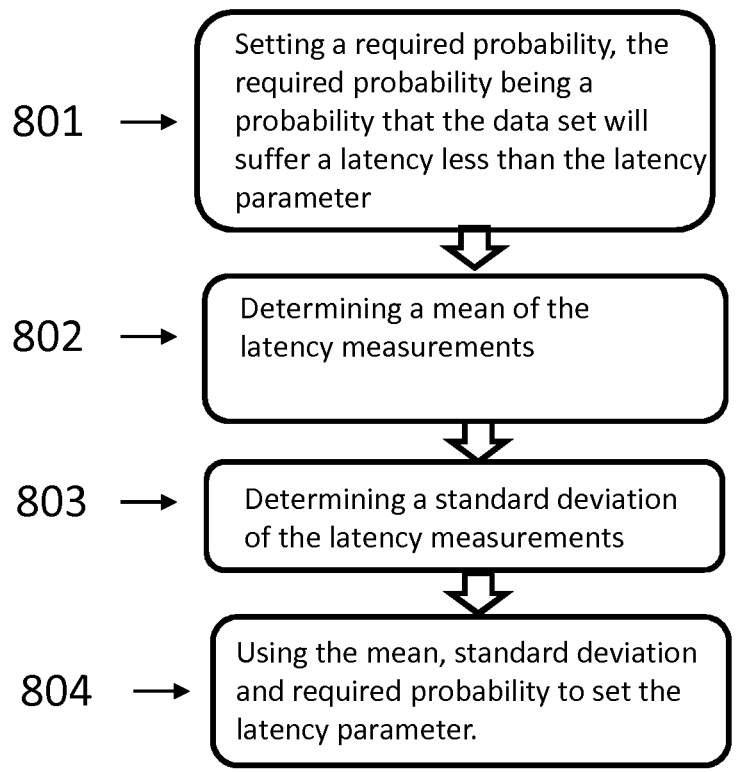
FIG. 8 is a flow chart illustrating a method of estimating a latency parameter for use in an embodiment.

FIG. 8 is a flow chart illustrating a method of determining the latency parameter according to an embodiment. The method comprises the steps of setting 801 a required probability, the required probability being a probability that the data set will suffer a latency less than the latency parameter, determining 802 a mean of the latency measurements, determining 803 a standard deviation of the latency measurements, and using 804 the mean, standard deviation and required probability to set the latency parameter.

In an embodiment, the normal distribution is used to determine the latency parameter from the latency measurements of the test data. In another embodiment, a Pareto distribution is used. The person skilled in the art will appreciate that other distributions may be used and the disclosure is not limited to any one statistical distribution or other means to determine the latency parameter.

In an embodiment, instead of using synchronous replication, a "pseudo-synchronous" method is used instead. In pseudo-synchronous replication, it is not required to wait for an acknowledgement to be received before informing the application that replication is complete. Instead, an assumption is made that after a period equal to an assumed transmission delay, which, in an embodiment, is equal to a one way trip between the first data center and the replicating data center, plus a "write-time" at the data center performing the replication, that replication is then complete. This period is referred to as a "replication wait period". An application running on a server in the first data center for which the replication is being performed, will, after sending data for replication, wait for a period equal to this acknowledgment wait period, before resuming its processes. The application operates on the basis that the replication process is completed within this replication wait period. There are a number of options by which this may be implemented.

In an embodiment, a controller is provided for the first data center which controls the process of replication. This controller may be located at the first data center and/or at one or more further locations, i.e. remotely. In an embodiment, the controller, after determining the latency of the path, sends a replication wait time to the application. The application then uses the provided replication wait time in replication, e.g. when controlling the replication processes itself. During replication, the application transmits the data to the replication data center and then waits a period equal to the replication wait time before resuming its processes dependent on the replication being completed.

In another embodiment, the controller maintains control of the replication process. When replication is taking place, after data is transmitted, the controller waits a period equal to the replication wait time and then sends to the application an indication that the replication process is complete. This indication is treated by the application as equivalent to an acknowledgement from the replicating data center. This embodiment has the advantage that applications do not need to be revised to handle pseudo-synchronous replication.

In an embodiment, the assumed transmission delay (i.e. as part of the replication wait time) is calculated using the latency parameter determined by a method described above. For example, if the latency parameter represents a round trip delay, then the assumed transmission delay may be taken as half the latency parameter to represent a one way latency. In another embodiment, the assumed transmission delay may be determined differently from the latency parameter, either by using a different means of calculation or by using the same calculation method, but with different parameters, such as changing the required probability. The person skilled in the art will appreciate that there are a number of different ways the assumed transmission delay can be determined and that the disclosure is not limited to any one method. In an embodiment, the method further comprises the step of providing a confirmatory acknowledgement. This is received after the application has received the indication that replication is complete. The acknowledgement provides an improvement in robustness.

Figure 2:
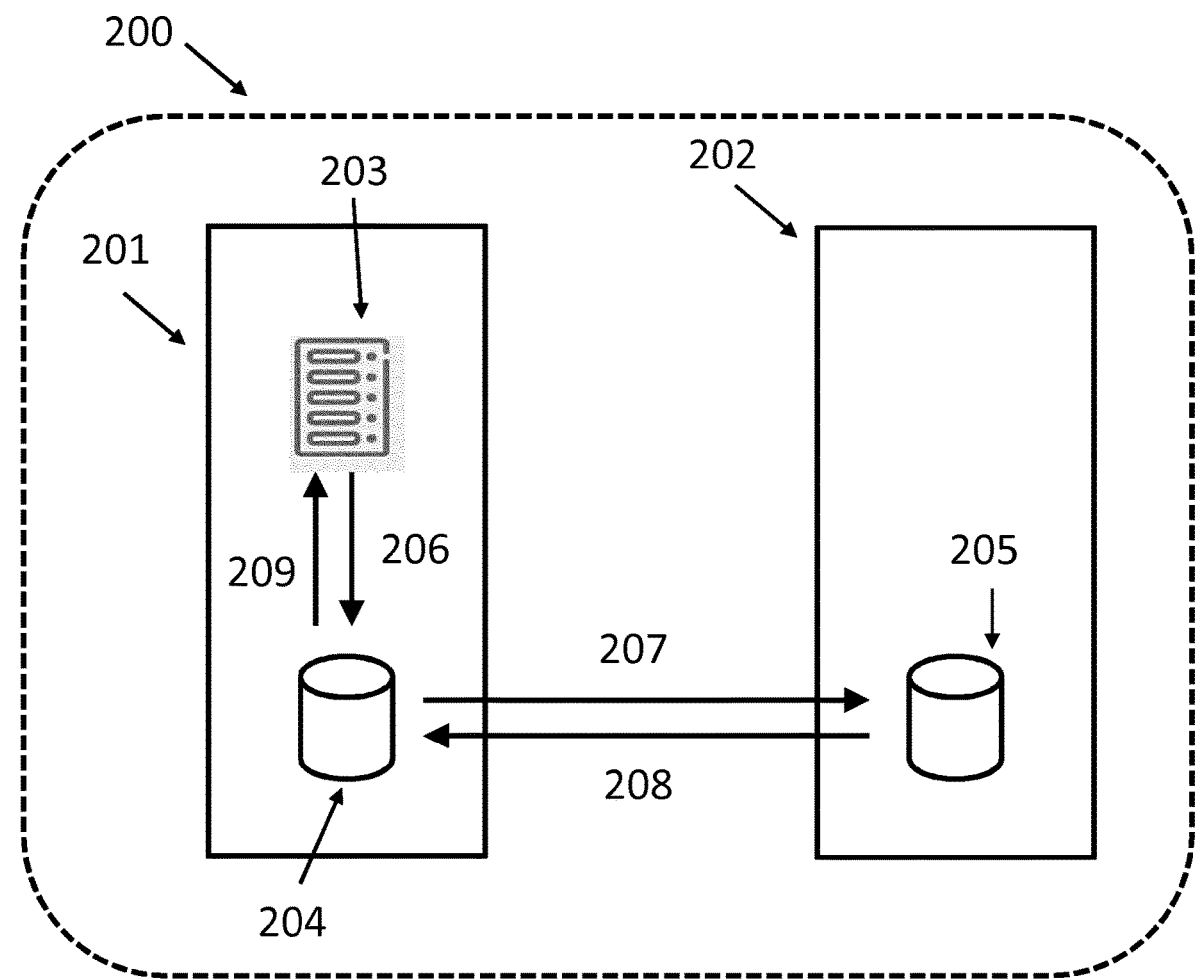
FIG. 2 is a data flow diagram illustrating synchronous replication.
Figure 3:
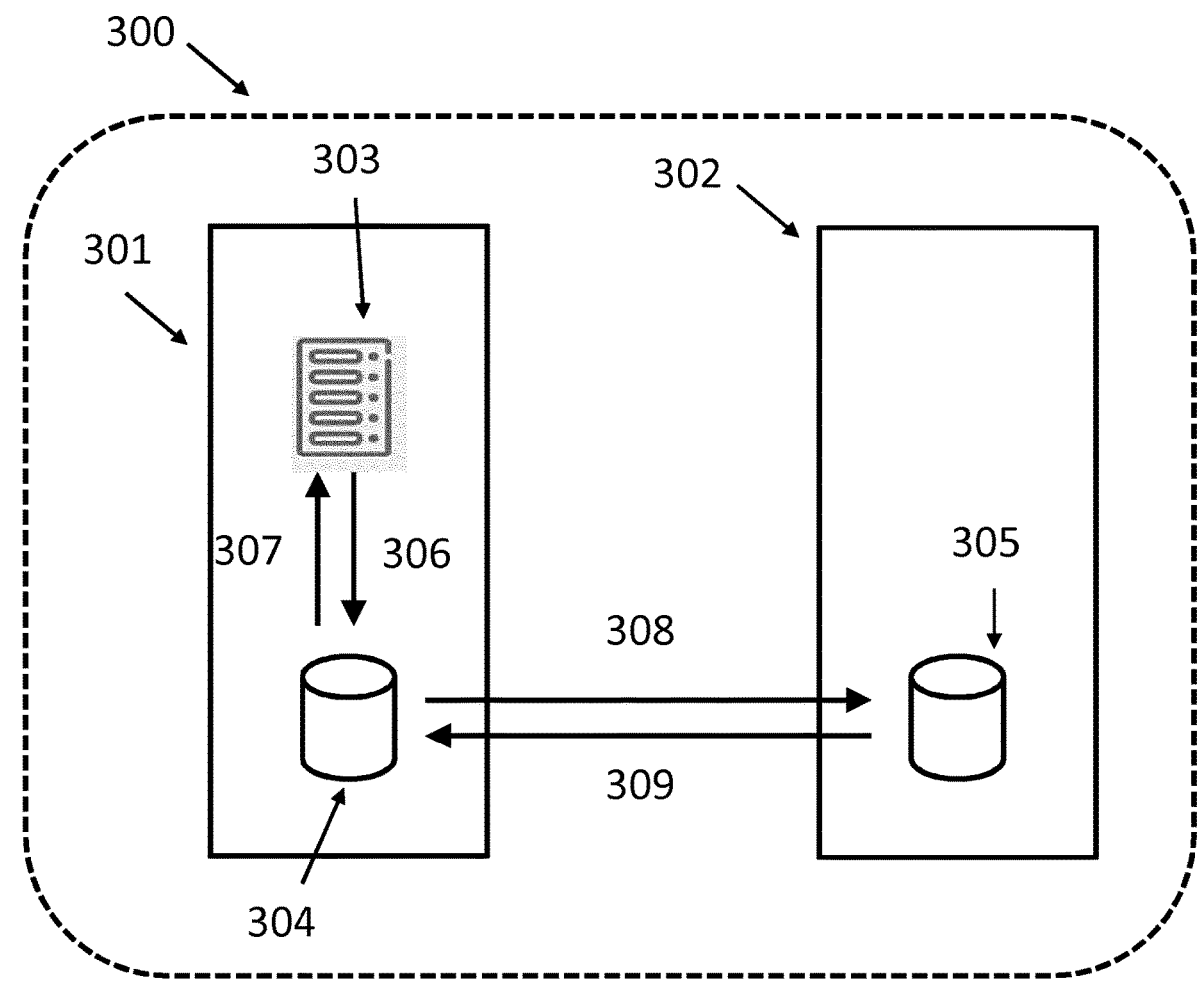
FIG. 3 is a data flow diagram illustrating asynchronous replication.
Figure 4:
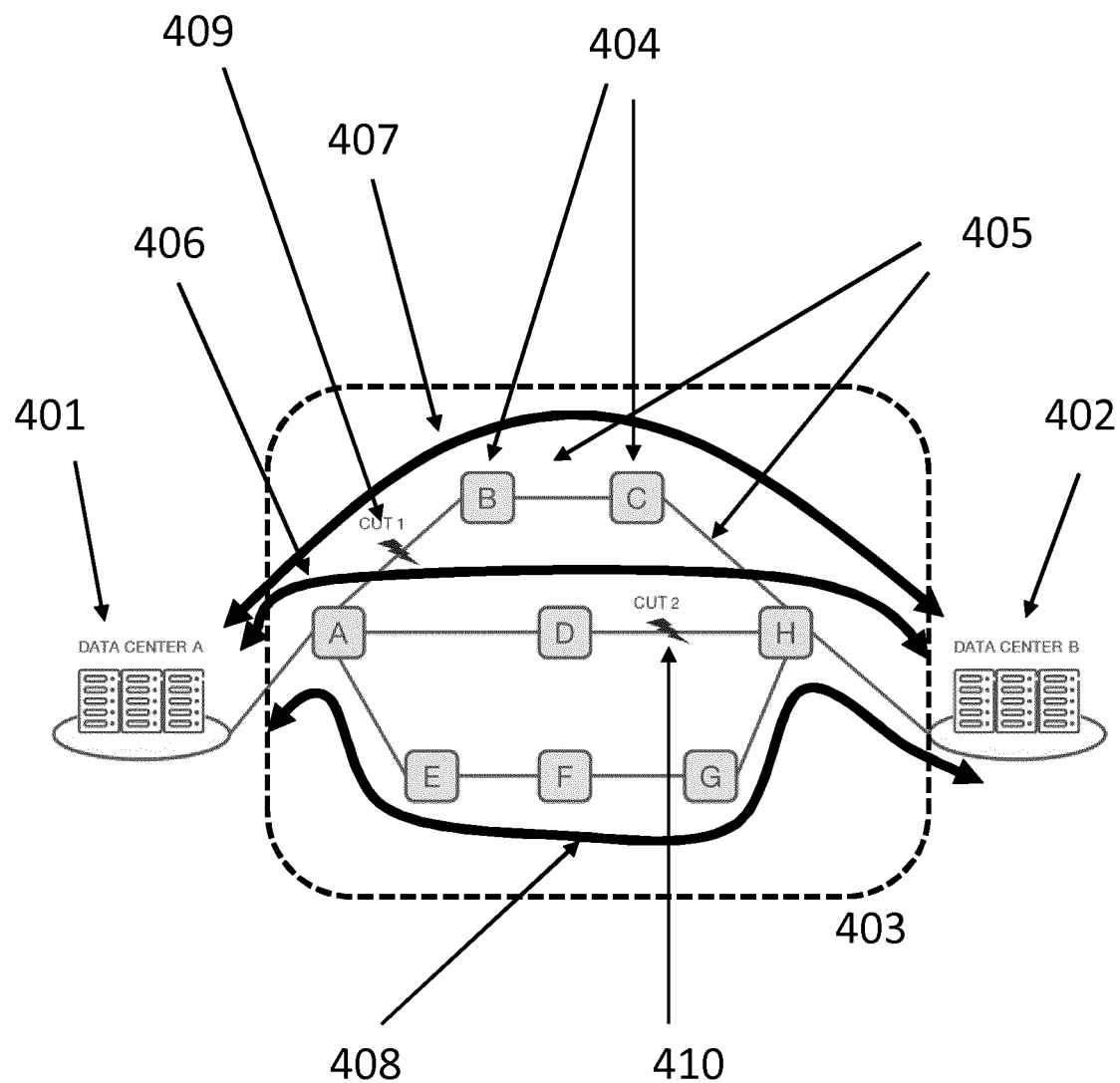
FIG. 4 is a schematic diagram illustrating an attack against a system using synchronous replication.

An example which illustrates numerically the advantage of the pseudo-synchronous approach is now provided. In the synchronous mode, illustrated in FIG. 2, assuming that the time required to write data onto the second local storage 205 is w and the one way delay is e, the acknowledgment from the second data center 202 will arrive at the first data center after a time 2*e+w since the beginning of the replication process. For instance, for a distance of 100 km between two DCs, the fastest possible roundtrip takes 1000 µs, and a typical write to storage completes in about 10-20 µs. This means that the acknowledgement would arrive after 1020 µs.

In the proposed pseudo-synchronous mode, the first data center will operate on the basis that the replication is completed in a time e+w (520 µs in the example) without waiting for an acknowledgment from the second data center.

Figure 9:
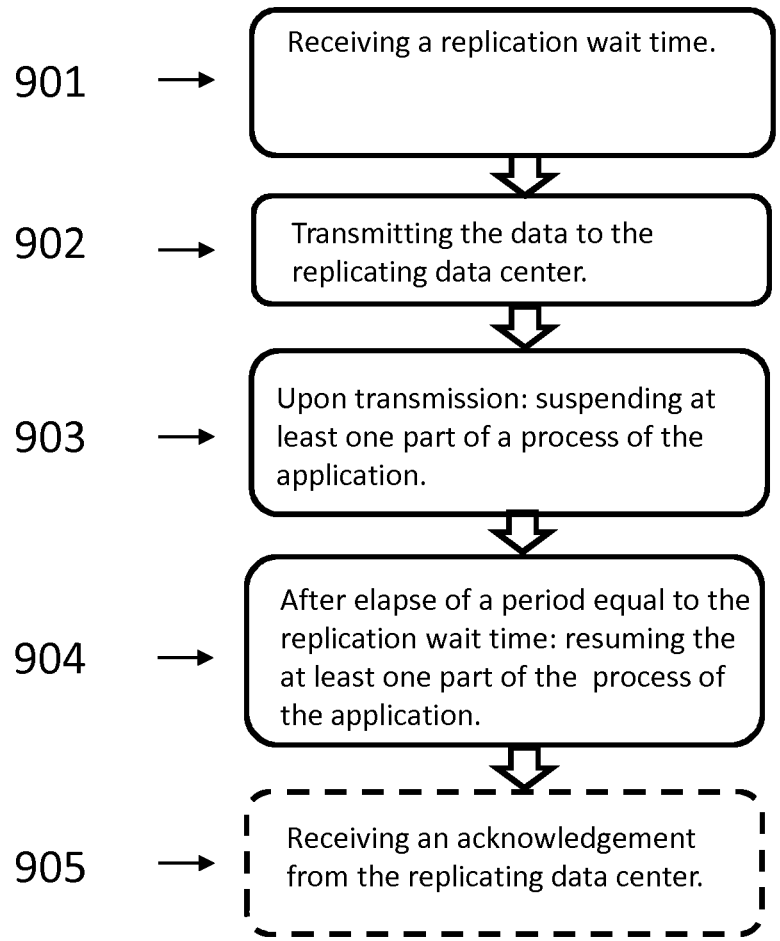
FIG. 9 is a flow chart illustrating a method of data replication according to an embodiment.

FIG. 9 is a flow chart illustrating a method of pseudo-synchronous replication according to an embodiment. At an application running in the first data center, the method comprises receiving 901 a replication wait time and transmitting 902 the data to a said replication data center. Upon transmission, the method further comprises suspending 903 at least one part of a process of the application, and after elapse of a period equal to the replication wait time resuming 904 the at least one part of the process of the application. In an embodiment, the method further comprises the steps of receiving an acknowledgement from the destination data center 905.

Figure 10:
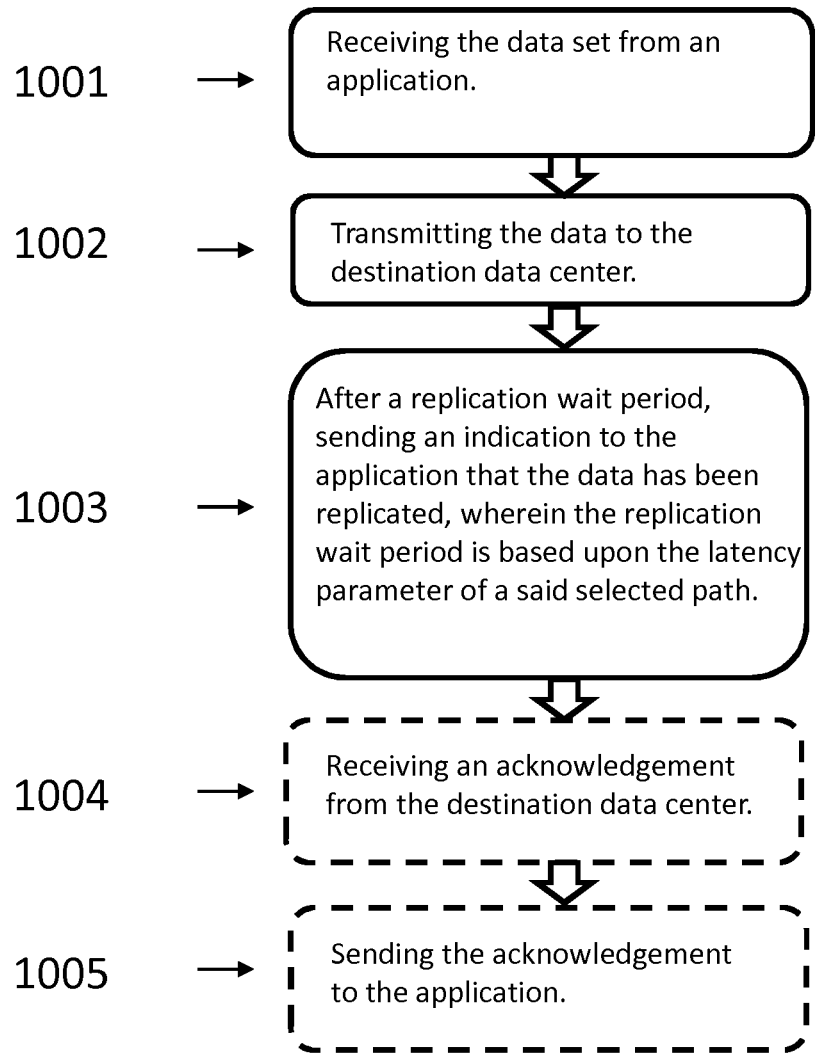
FIG. 10 is a flow chart illustrating a method of data replication according to an embodiment.
Figure 11:
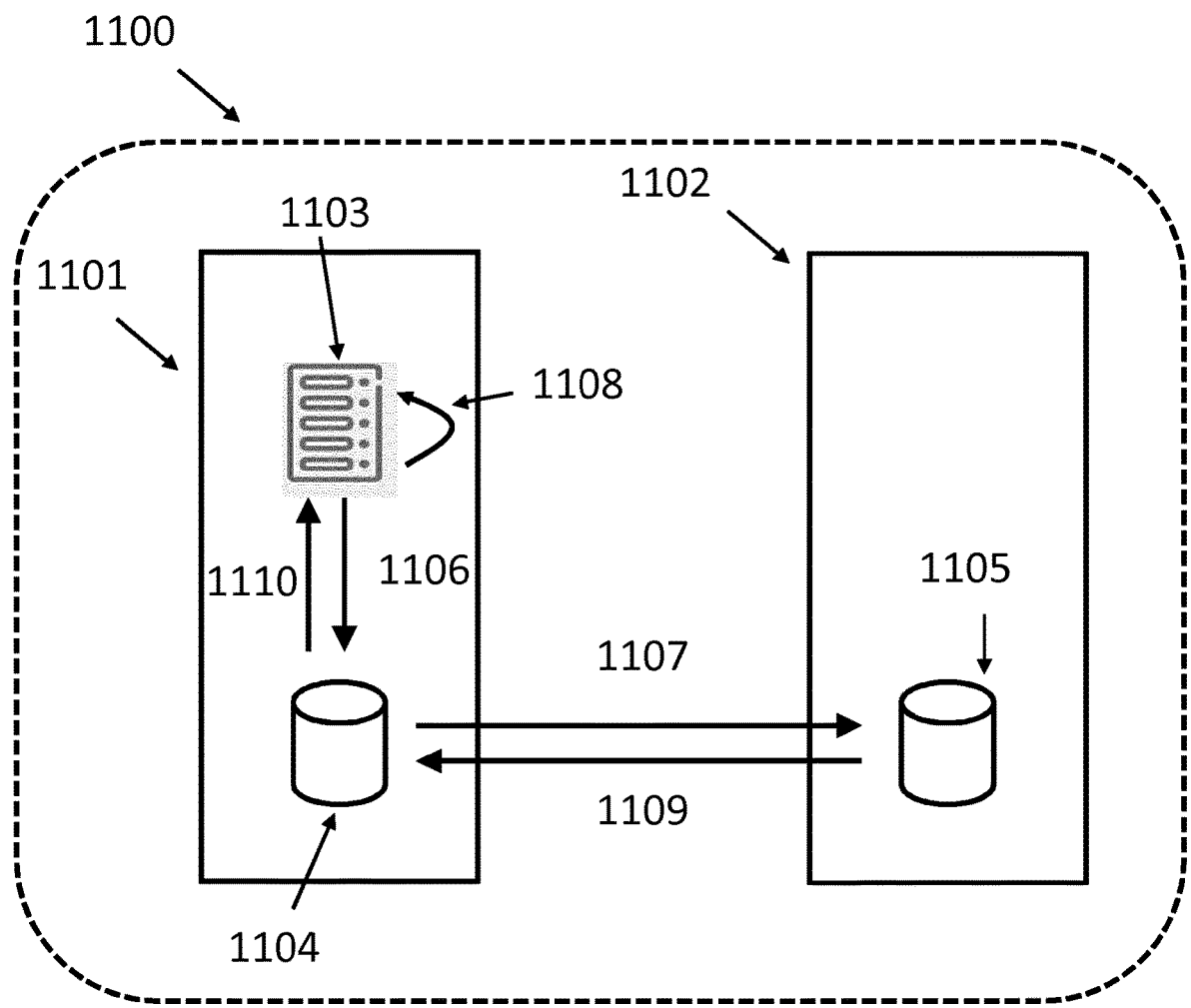
FIG. 11 is a data flow diagram illustrating pseudo-synchronous replication according to an embodiment.

FIG. 10 is a flow chart illustrating a method of pseudo-synchronous replication according to an embodiment. The method comprises the steps of receiving 1001 the data set from an application, transmitting 1002 the data to the destination data center, and, after a replication wait period, sending 1003 an indication to the application that the data has been replicated, wherein the replication wait period is calculated using the latency parameter of a said selected path. In an embodiment, the method further comprises the steps of receiving an acknowledgement from the destination data center 1004 and sending the acknowledgement 1005 to the application. FIG. 11 is a data flow diagram illustrating pseudo-synchronous replication according to an embodiment. The system 1100 comprises a first data center 1101, a second data center 1102, a server 1103 comprising an application for which data is to be replicated, a local storage 1104 at the first data center and back-up storage at the second data center 1105. The steps of the pseudo-synchronous replication begin with the transfer 1106 of the data from the server 1101 to the local storage 1104, and hence the data is transmitted 1107 to the second data 1102 and stored in the back-up storage 1105. After a period determined by the write-time at the back-up storage and the latency of transmission, an acknowledgement indication 1108 is sent to the application. After this acknowledgement is received by the application, the application can operate on the basis that replication has been completed. An acknowledgement indication is then sent 1109 from the replicating data center 1102 to the local storage and hence 1110 to the application.

The price of using the pseudo-synchronous approach is a slightly reduced robustness due to the assumption that data are replicated in the replication data center before the acknowledgment is received. However, the acknowledgments sent by the replication data center, confirm a short time afterwards that the assumption of completed replication is correct or not. As a consequence, the pseudo-synchronous approach becomes more and more reliable over the time.

In an embodiment, if it is possible to provide a path suitable for synchronous replication, then replication is performed on this path. If it is not possible to find a data center with a path suitable for synchronous replication, then pseudo-synchronous replication is performed. In another embodiment, the above described methods may be used to identify a path which is suitable for pseudo-synchronous replication.

In an embodiment, the above described methods may be carried out at a controller for the first data center. The controller may be located at the first data center, or may be located "in the cloud", at a remote location. The person skilled in the art will appreciate that the location of the controller is immaterial and the disclosure is not limited to any one location of controller.

Figure 12:
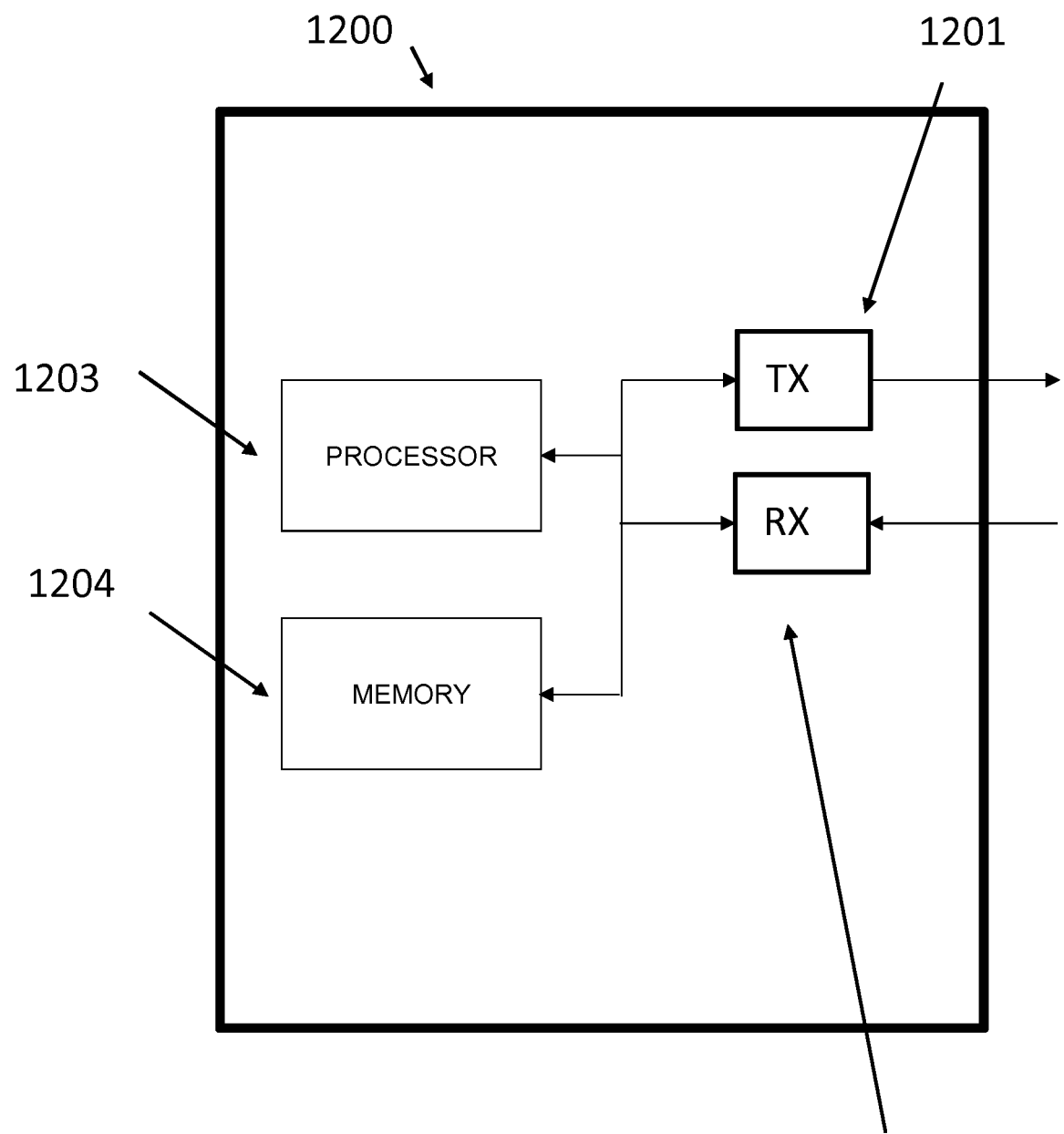
FIG. 12 is a schematic diagram of a controller according to an embodiment.

FIG. 12 is a schematic diagram of a controller 1200 according to an embodiment. The controller comprises a transmitter 1201, a receiver 1202, a processor 1203 and a memory 1204. The processor 1203 is configured to carry out any example described, in association with the memory 1204, transmitter 1201 and receiver 1202. In some aspects, the processor 1203 is arranged to execute a computer program, which executes or controls a method described. The processor 1203 may be considered as processing circuitry. Processing circuitry is provided using any combination of one or more of a suitable central processing unit (CPU), multiprocessor, microcontroller, digital signal processor (DSP), etc., capable of executing software instructions stored in a computer program product e.g. in the form of a storage medium. The processing circuitry 210 may be provided as an application specific integrated circuit (ASIC), or field programmable gate array (FPGA). The memory may comprise persistent storage, which, for example, can be any single one or combination of magnetic memory, optical memory, solid state memory or even remotely mounted memory.

Figure 13:
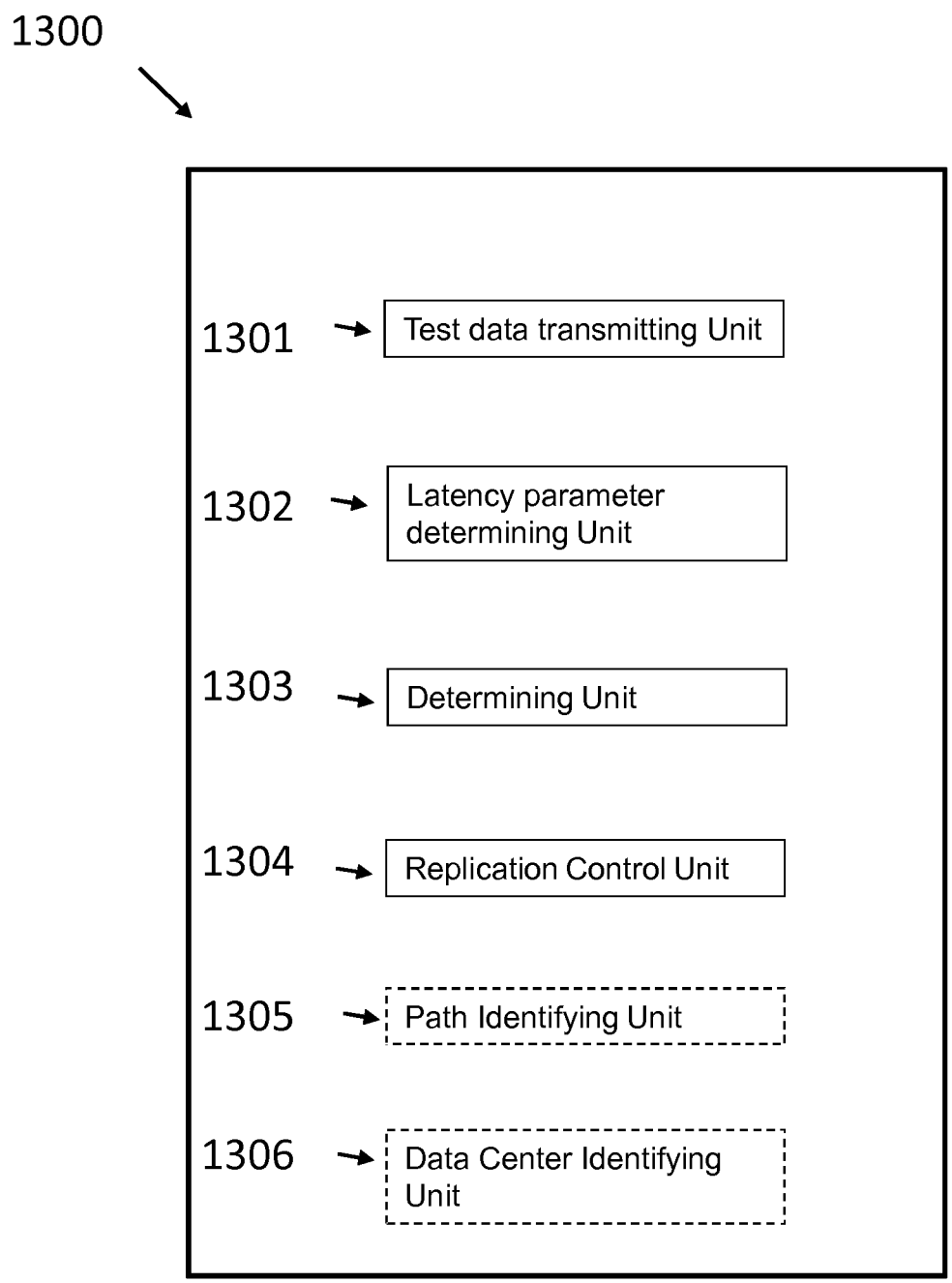
FIG. 13 is a schematic diagram illustrating the logical units of an apparatus 1200 for use in a controller according to an embodiment.

FIG. 13 is a schematic diagram illustrating the logical units of an apparatus 1300 for use in a controller according to an embodiment. The apparatus comprises a test data transmitting unit 1301 for transmitting test data, a latency parameter determining unit 1302 for determining a latency parameter of a path, and a determining unit 1303 for determining if the latency parameter of the test data is less than a maximum latency threshold and replication control unit 1304 for performing replication of the data set using the first path. In an embodiment, the controller further comprises a path identifying unit 1305 for identifying paths for data replication. In an embodiment, the controller further comprises a data center identifying unit 1206 or identifying suitable replication data centers. The apparatus 1300 may be implemented by a processor and/or memory, e.g. as described for FIG. 12.

Figure 14:
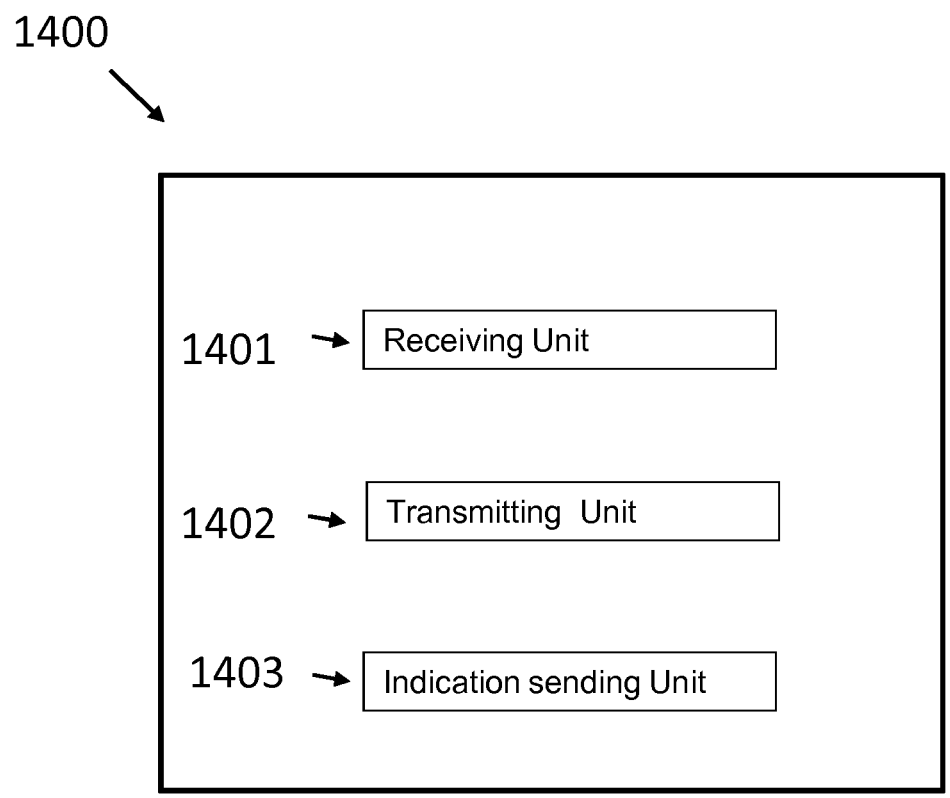
FIG. 14 is a schematic diagram illustrating the logical units of an apparatus for use in a controller according to an embodiment.

FIG. 14 is a schematic diagram illustrating the logical units of an apparatus 1400 for use in a controller according to an embodiment. The apparatus comprises a receiving unit 1401 for receiving data set from an application, a transmitting unit 1402 for transmitting the data to a said replication data center and an indication sending unit 1403 for, after a replication wait period, sending an indication to the application that the data has been replicated, wherein the replication wait period is calculated using the latency parameter of a said path selected for replication. The apparatus 1400 may be implemented by a processor and/or memory, e.g. as described for FIG. 12.

In order to implement the method herein disclosed, instructions may be provided in the form of a computer programs downloadable to the network nodes or controller. This may be in the form of a computer program product, typically contained on a carrier such as an electrical signal, an optical signal, a radio signal, a magnetic tape or disk, an optical disk or a memory stick.

The disclosure also enables improvements in case of distributed servers that need to operate consistently. One basic principle of such systems is for distributed servers to wait "enough time" to get updates from all servers before completing their own processes, in order to guarantee that consistent and fair decisions are taken. Assumptions on worst case latencies were conventionally made in this case, thus leading to a non-optimal performance. With the proposed solution, by determining the actual "real time" latency, processing on the distributed servers can be based on the real status of the network rather than on the worst case ("waiting time" is reduced) so that improvements in the performance are possible.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of data replication between a first data center and a second data center, wherein the first data center has a data set to be replicated, the method comprising:
   determining whether a first path from the first data center to the second data center is suitable for the data set to be replicated, by:
      transmitting test data along the first path;
      taking latency measurements for the test data along the first path;
      determining a latency parameter of the first path using the latency measurements; and
      determining if the latency parameter of the test data is less than a maximum latency threshold; and
   performing or not performing replication of the data set using the first path, depending respectively on whether or not the latency parameter is determined to be less than the maximum latency threshold.

2. A method of data replication according to claim 1, wherein the latency parameter of the first path is determined to be greater than the maximum latency threshold, and wherein the method further comprises:
   identifying a second path between the first data center and the second data center;
   determining whether the second path from the first data center to the second data center is suitable for the data set to be replicated, by:
      transmitting test data along the second path;
      taking latency measurements for the test data along the second path;
      determining a latency parameter of the second path using the latency measurements taken for the test data along the second path; and
      determining if the latency parameter of the second path is less than the maximum latency threshold; and
   performing or not performing replication of the data set using the second path, depending respectively on whether or not the latency parameter of the second path is determined to be less than the maximum latency threshold.

3. A method of data replication according to claim 1, further comprising:
   identifying a group of paths between the first data center and the second data center; and
   if a respective latency parameter for each path in the group is greater than the maximum latency threshold, identifying that the second data center cannot be used for synchronous replication; and,
   if the second data center cannot be used:
      identifying a third data center which has a path to the first data center, the path having a latency parameter less than the maximum latency threshold; and
      performing replication of the data set at the third data center.

4. The method according to claim 1, wherein performing or not performing replication of the data set using the first path comprises performing replication of the data set using the first path, wherein said performing comprises, at an application running in the first data center:
   receiving a replication wait time;
   transmitting the data set to the second data center;
   upon transmission of the data set to the second data center, suspending at least one part of a process of the application;
   after elapse of a period equal to the replication wait time, resuming the at least one part of the process of the application.

5. The method according to claim 4 further comprising receiving an acknowledgement from the second data center.

6. The method according to claim 1, wherein performing or not performing replication of the data set using the first path comprises performing replication of the data set using the first path, wherein said performing comprises, at a controller for the first data center:
   receiving the data set from an application;
   transmitting the data set to the second data center; and
   after a replication wait period, sending an indication to the application that the data set has been replicated, wherein the replication wait period is calculated using the latency parameter of the first path.

7. The method according to claim 6 further comprising receiving an acknowledgement from the second data center.

8. The method according to claim 6, wherein the replication wait period is a period calculated using the latency parameter of the first path and an estimated write period at the second data center.

9. The method according to claim 1, wherein determining the latency parameter of the first path comprises:
   determining a mean of the latency measurements taken for the test data along the first path;
   determining a standard deviation of the latency measurements taken for the test data along the first path;
   setting a required probability, the required probability being a probability that the data set will suffer a latency less than the latency parameter; and
   using the mean, standard deviation and required probability to set the latency parameter.

10. The method according to claim 1, wherein latency estimation is performed periodically during a data replication.

11. A controller for a data center network, the controller comprising:
a processor;
a memory for storing data and instructions;
a transmitter for transmitting data to the data center network; and
a receiver for receiving data from the data center network;
wherein the processor is configured to:
transmit test data along a first path from a first data center to a second data center;
take latency measurements for the test data along the first path;
determine a latency parameter of the first path using the latency measurements;
determine if the latency parameter of the test data is less than a maximum latency threshold; and
perform or not perform replication of the data set using the first path, depending respectively on whether or not the latency parameter is determined to be less than the maximum latency threshold.

12. The controller according to claim 11, wherein the latency parameter of the first path is determined to be greater than the maximum latency threshold, and wherein the processor is further configured to:
identify a second path between the first data center and the second data center;
determine whether the second path from the first data center to the second data center is suitable for the data set to be replicated, by:
transmitting test data along the second path;
taking latency measurements for the test data along the second path;
determining a latency parameter of the second path using the latency measurements taken for the test data along the second path; and
determining if the latency parameter of the second path is less than the maximum latency threshold; and
perform or not perform replication of the data set using the second path, depending respectively on whether or not the latency parameter of the second path is determined to be less than the maximum latency threshold.

13. A controller according to claim 11, wherein the processor is further configured to:
identify a group of paths between the first data center and the second data center; and
if a respective latency parameter for each path in the group is greater than the maximum latency threshold, identify that the second data center cannot be used for synchronous replication; and,
if the second data center cannot be used:
identify a third data center which has a path to the first data center, the path having a latency parameter less than the maximum latency threshold; and
perform replication of the data set at the third data center.

14. A controller according to claim 11, wherein the processor is configured to perform replication of the data set using the first path by, at an application running in the first data center:
receiving a replication wait time;
transmitting the data set to the second data center;
upon transmission of the data set to the second data center, suspending at least one part of a process of the application;
after elapse of a period equal to the replication wait time, resuming the at least one part of the process of the application.

15. A controller according to claim 14, further configured to store the data set at a local storage within the first data center.

16. A controller according to claim 11, wherein the processor is further configured to:
determine a mean of the latency measurements taken for the test data along the first path;
determine a standard deviation of the latency measurements taken for the test data along the first path;
use a required probability, the mean, and the standard deviation to determine the latency parameter, wherein the required probability is a probability that the data set will suffer a latency less than the latency parameter.

17. A controller according to claim 11, further comprising a clock with an accuracy at least 0.1 of a minimum latency.

18. A data center comprising a controller for a data center network, the controller comprising:
a processor;
a memory for storing data and instructions;
a transmitter for transmitting data to the data center network; and
a receiver for receiving data from the data center network;
wherein the processor is configured to:
transmit test data along a first path from a first data center to a second data center;
take latency measurements for the test data along the first path;
determine a latency parameter of the first path using the latency measurements;
determine if the latency parameter of the test data is less than a maximum latency threshold; and
perform or not perform replication of the data set using the first path, depending respectively on whether or not the latency parameter is determined to be less than the maximum latency threshold.

19. A non-transitory computer-readable storage medium on which is stored a computer program, wherein the computer program comprises instructions which, when executed on at least one processor of a controller for a data center network, cause the at least one processor to:
transmit test data along a first path from a first data center to a second data center; take latency measurements for the test data along the first path;
determine a latency parameter of the first path using the latency measurements; determine if the latency parameter of the test data is less than a maximum latency threshold; and
perform or not perform replication of the data set using the first path, depending respectively on whether or not the latency parameter is determined to be less than the maximum latency threshold.

* * * * *